United States Patent Office 2,945,817
Patented July 19, 1960

2,945,817
SILICA-SILICONE AEROGELS AND THEIR PREPARATION

Kenneth B. Goldblum, Pittsfield, Mass., assignor to General Electric Company, a corporation of New York No Drawing. Filed Sept. 4, 1956, Ser. No. 607,591

6 Claims. (Cl. 252—317)

This invention relates to the production of silica-silicone aerogels. More particularly, this invention relates to the production of novel silica-silicone aerogels by a process which involves the substantially complete replacement, by a process of azeotropic distillation, of the water present in the sol with a solvent having a considerably lower critical temperature than water.

Silica-silicone aerogels have previously been known. Thus, U.S. Patent 2,441,422 to Krieble et al., assigned to the assignee of the present invention, discloses the formation of silica-silicone aerogels characterized by a high degree of water repellency. In general, these aerogels are prepared by mixing a solution of an alkali silicate and an alkali siliconate with an acidifying agent to precipitate a cogel of silicic acid and siliconic acid. After washing, the cogels are confined in a pressure vessel where the solvent medium, in which the gel is formed, is removed by heating the cogels to above the critical temperature of the solvent while maintaining the pressure at or above the critical pressure.

One of the difficulties encountered in the above described processes is the presence of water in the solvent medium during the heating or autoclaving step. Water has an extremely high critical temperature and pressure in comparison to many organic solvents. The critical temperature of water is 374° C. and its critical pressure about 3200 p.s.i. In contrast, the critical temperature of propanol, for example, is 263.7° C. and its critical pressure 733 p.s.i. Ethanol and other lower alcohols have similarly low critical constants in comparison with water.

In order to avoid the high temperatures and pressures required when water is employed as the solvent, various means have been used to replace the water with an organic solvent. The precipitation of the gel is ordinarily accompanied by the formation of salts from the alkali ions and the acid. These salts may be removed as much as possible by washing and the aqueous medium in which the gelation is carried out may be partially replaced with another solvent, with a more satisfactory critical temperature.

Another method aimed at avoiding the high critical constants of water consists of controlling the initial pH so that a sol rather than a gel is formed. An organic solvent is then added directly to the sol and a mixed organo-aqua sol is formed. The addition of the organic solvent precipitates the salt which may then be removed.

In spite of the above efforts aimed at removal of water, in the absence of expensive processing techniques, there is always some water present in the sol or gel prior to autoclaving. The presence of this water results in several drawbacks.

The primary drawback, in so far as the process of autoclaving is concerned, is that the presence of water requires both higher temperatures and higher pressures in order to form the aerogel. However, in addition to the more expensive equipment costs necessitated by higher temperatures and pressures, the presence of water also results in a product which is ordinarily contaminated with salts, i.e., the alkali-metal salts of the mineral acids. It is well known that these sales act as a depolymerizing agent on silicone rubber and silicones in general. In view of the widespread use of aerogels as an additive to resins and silicone rubbers, the presence of salts is obviously disadvantageous. In addition, the salt as a contaminant has a possible corrosive effect in other applications. For example, an aerogel can be used as thermal insulation and in this use might become wetted with water. The presence of salt will aggravate the corrosion of the metal walls of the appliance to which the thermal insulation is applied. In addition, the presence of salts such as, for example, sodium sulphate or sodium chloride, might overcome the hydrophobicity of the aerogel, rendering the aerogel moisture-sensitive and unsuitable for hydrophobic applications.

It is, therefore, a primary object of this invention to provide an economical and relatively simple process for the replacement of substantially all of the water present in the sol prior to the removal of solvent by autoclaving.

It is still a further object of this invention to produce a novel class of aerogels with improved hydrophobic characteristics, which are free of salt contamination and which have an improved thickening action when used as fillers for grease.

The present invention involves the discovery that a novel and improved class of hydrophobic aerogels may be produced by azeotropically distilling the water from the sol to remove substantially all of the water prior to autoclaving. The process is economical to carry out and enables the use of generally milder autoclaving temperatures and pressures. The areogels of this invention have been found to differ chemically from those prepared by priod methods and, in addition, have been found to be free of salt contamination.

Briefly stated, the process of this invention involves the steps of (1) forming an aqueous sol from an alkali-metal silicate and an alkali-metal organo-siliconate, (2) removing the water from the aqueous sol by distilling the water therefrom with an azeotrope comprising an alcohol having a critical temperature below 300° C., said azeotropic distillation being carried out until substantially all the water has been removed from the aqueous sol, and (3) removing the alcohol at a temperature and pressure of at least the critical temperature and pressure of the alcohol.

The azeotropic systems useful in the practice of this invention may be either a binary or a ternary system. Thus, the azeotrope may be composed of water and an alcohol having a critical temperature below 300° C., such as ethyl, n-propyl, iso-propyl, n-butyl or other aliphatic monohydric alcohols. Suitable ternary azeotropes include water, the aforesaid alcohols, and, in addition, either benzene, diethoxymethane or n-propyl acetate. In general, it has been found, however, that best results are achieved by the use of a binary system comprising water and one of the aforesaid aliphatic monohydric alcohols. A preferred azeotropic system is the binary of water and either ethanol or propanol. The latter alcohols are preferred particularly because they have been found to be a desirable solvent with which to replace water.

The silicone component of the aerogel is preferably derived from an alkali organo-siliconate (i.e., an alkali-metal salt of a hydrocarbon-substituted silanetriol), particularly a sodium siliconate containing a lower alkyl (e.g., methyl, ethyl, propyl, etc.) or aryl (e.g., phenyl, biphenyl, tolyl, benzyl, etc.) group as the organic radical attached to the silicon atom. The structural formula of these siliconates is believed to be

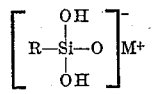

where R is a monovalent alkyl or aryl radical and M is an alkali-metal ion such as Na, K or Cs. These siliconates can be obtained, for example, by dissolving an organopolysiloxane in an aqueous or aqueous-alcoholic solution of an alkali-metal hydroxide as is more fully described in U.S. Patent 2,507,200 to Elliott et al., assigned to the same assignee as the present invention. Briefly described, the preferred method of preparation comprises the hydrolysis of a suitable organotrichlorosilane or other mono-organosilane containing three hydrolyzable groups and one lower alkyl or aryl radical attached to the silicon atom and the subsequent solution of the hydrolysis product in an aqueous or aqueous-alcoholic solution of an alkali-metal hydroxide in the ratio of at least about one mol of alkali-metal hydroxide per atom of silicon, thereby to form a solution comprising an alkali-metal salt of a hydrocarbon-substituted siliconic acid, e.g., methyl siliconic acid. For brevity, these alkali-metal organosiliconates will hereinafter be referred to as alkali siliconates.

The sols may be prepared from these alkali-metal salts of the organo-silicon compounds and water glass or equivalent alkali silicate in various ways. For example, solutions of water glass and an alkali siliconate or an alkali siliconate and an alkali salt of a silanediol (the formula of which is

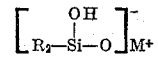

where R and M have the same meanings as in the structural formula for the triols above) in various proportions may be mixed with an acid which will liberate the siliconic acid and silicic acid in colloidal form. Any acid or salt or ion exchange body suitable for the preparation of ordinary silica sols and gels may be employed to form the colloidal solution. Subsequent to the formation of this aqueous sol, the alcohol or other ingredients of the azeotropic system are added. The sol, including the additional azeotropic solvents, are then distilled to remove the water present in the system while adding additional non-aqueous solvent to keep the volume constant. The resulting non-aqueous sol is then placed in a pressure vessel and heated to the critical temperature. The temperatures and the pressures employed are generally a function of the alcohol used in the azeotropic system. These temperatures and pressures will be lower than those ordinarily employed with aqueous sols or gels.

In order that those skilled in the art may better understand how the present invention may be carried into effect, the following illustrative examples are given. All percentages are by weight.

The following example illustrates the preparation of a 20% silicone, 80% silica aerogel from a propanol sol:

The sodium salt of methylsilane triol used in the following examples were prepared by hydrolyzing 1 mol of methyltrichlorosilane by adding it rapidly with stirring to a large excess of water. The amount of water present was substantially in excess over that required to effect complete hydrolysis of all the silicon-bonded chlorine in the methyltrichlorosilane.

The resultant solution was allowed to stand until substantially all the methylpolysiloxane had precipitated in the form of a fine powder. This powder was filtered from the remaining solution, washed to remove acid, filtered and dried. The solid gel particles were dissolved by stirring in a 50%, by weight, aqueous sodium hydroxide solution. Generally, 1 mol of the methylpolysiloxane is allowed to react with about 1 to 1.05 mols of sodium hydroxide to give the alkali-metal salt, namely, the sodium salt of methylsilane triol. The resultant alkaline solution had a total solids content of about 46.7%, of which about 14.3% was titrated as sodium oxide and contained about 30% methylpolysiloxane solids calculated as $CH_3SiO_{1.5}$. The composition had a specific gravity of about 1.35 to 25° C. and a pH of about 13. This sodium salt of methylsilanetriol (which is also known as sodium methyl siliconate) is believed to have the following structure in dilute aqueous solution:

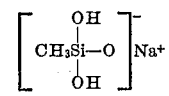

This salt will hereinafter be referred to as sodium methyl siliconate, for brevity.

EXAMPLE 1

A blend of 249 grams of sodium methyl siliconate and 1090 grams of sodium silicate were acidified by adding the blend to 2500 grams of hydrogen ion exchange resin, Amberlite IR 120 (acidity—1.8 milliequivalents/gram, manufactured by Rohm and Haas), and 2150 grams of water at the rate of about 10 ml. per minute. (The hydrogen ion exchange resin could have been replaced by a mineral acid such as HCl. The exchange resin functions both as an acidifying agent and for removal of the salt-forming sodium ions.) While the mixture was vigorously stirred, it was diluted with one liter of propanol after 90% of the sodium salt blend had been added. The addition of the acid and water having been completed, the stirring was stopped immediately and the sol was decanted from the resin. The ion exchange resin was then washed with three separate portions of propanol. The total volume of propanol in the system was 6720 grams of 8380 ml. The sol and the washings (approximately a 70% propanol mixture) were transferred to a stirred 12-liter flask and heated. A water-propanol azeotrope was removed and the volume of the liquid in the flask was kept constant by adding dry propanol. A total of 22.5 liters of distillate were removed and the vapor temperature of the distillate was approximately that of pure propanol.

The propanol sol contained 5.3% solids composed of 20% methyl silicone and 80% silica. This sol was stored at 40° F. and had an ungelled shelf life of at least 10 days. 1660 grams of the sol were charged to a glass test tube, placed in a pressure bomb, sealed and heated to the reaction temperature. The pressure of the vessel was kept at 1000 p.s.i.g. by controlled venting. Venting started at about 210° C., but when the critical temperature (264° C.) was reached, only 900 of the 1920 ml. of distillate had been collected. Final temperatures of 275°, 290° and 305° were obtained on three different runs. The products as they came from the bomb were very hydrophobic.

In order to test the hydrophobicity of the aerogels resulting from the above five samples, a 0.25 gram sample in 15 ml. of water was shaken 5 minutes after adding successive 0.5 milliliter increments of methanol. The volume of methanol necessary to reduce the amount of aerogel floating to about 5% was taken as a measure of the relative hydrophobicity.

The weight of aerogel in grams resulting from each of the above three runs, the density of each of the aerogels and the hydrophobicity of the original product as determined by the method described above were then determined. In addition, each of the aerogels was heat-treated for five hours at 150° C. The results of these tests were as follows:

Table A

| Run | Final Temp., °C. | Aerogel, g. | Density, g./ml. | Methanol Wettability (Mfl) | |
|---|---|---|---|---|---|
| | | | | Orig. Prod. | After Heat Treatment |
| A | 305 | 88 | .052 | 3.0 | 5.5 |
| B | 290 | 88 | .064 | 3.0 | 5.0 |
| C | 275 | 88.6 | .051 | 3.5 | 5.0 |

In order to ascertain whether aerogels produced in accordance with this invention had a hydrophobicity which was chemically different from those produced without complete water removal, weight loss calculations were taken. Each of the three aerogels, labeled A, B and C, in Table A, were heat-treated for five hours at 250° C. The percentages of carbon in each of the aerogels before and after heat treatment were calculated. In the following Table B, the actual percentages of carbon in the aerogels prior and after heat treatment and the theoretical percentage of carbon in a 20% methyl silicone aerogel are given.

Table B

| Run | Percent Carbon | | |
|---|---|---|---|
| | Prior to Heat Treatment | After Heat Treatment | Theory |
| A | 12.7 | 3.6 | 3.58 |
| B | 13.6 | 4.0 | 3.58 |
| C | 13.0 | 3.8 | 3.58 |

The above results indicate that the aerogel contains more than the theoretical amount of carbon prior to heat treatment and approximately the same as the theoretical amount after heat treatment. If it is postulated that the additional carbon percentage results from propoxy ($C_3H_7O^-$) groups (from the propanol), then it would appear that the propoxy groups are volatilized off during the five-hour heat treatment at 250° C. In order to test this postulate, the theoretical percentage of propoxy content was compared with the actual loss after the above heat treatment. The results were as follows:

Table C

| Run | Theoretical Propoxy Content, percent | Actual Weight Loss on Heat Treatment, percent |
|---|---|---|
| A | 14.9 | 13.5 |
| B | 15.7 | 13.7 |
| C | 15.1 | 15.2 |

The results of Table C show good agreement, within experimental error, between theoretical propoxy content and actual weight loss. It would thus appear that the hydrophobicity depends upon the alkoxy content and not upon the silicone present in the aerogel. These results are further substantiated by the fact that silica-silicone aerogels prepared from less than 100% alcohol sols (i.e., a 70% ethanol sol) show negligible weight loss upon heating for five hours at 250° C.

The following example illustrates the preparation of a 10% silicone, 90% silica aerogel from a propanol sol.

EXAMPLE 2

A sol was made by acidifying a blend of 10% sodium methyl siliconate and 90% sodium silicate with hydrogen ion exchange resin Amberlite IR 120. This sol contained 4.5-5% solids composed of 10% methyl silicone and 90% silica in 70% propanol. The water was then removed by azeotropic distillation with the binary water-propanol, and a 100% propanol sol was produced. The sol was then autoclaved in a 250 ml. bomb at 275° C. and 1100 p.s.i.g. An aerogel was produced which had a bulk density of 0.097 gram/ml. In accordance with the hydrophobicity test outlined above in connection with Table A, 5 ml. of methanol was found necessary to wet the pigment.

The following example illustrates the preparation of hydrophobic aerogel containing 50% methyl silicone and 50% silica prepared from an ethanol sol.

EXAMPLE 3

To 42.5 milliliters of water and 400 milliliters of ethanol in a 1-liter fluted flask equipped with a high-speed stirrer, a mixture of 32.6 grams of sodium methyl siliconate and 35.4 grams of sodium silicate was added slowly at the same time that 150 grams of Amberlite IR 120 hydrogen ion resin were added. The pH of the solution was maintained between 4.5 and 5.4. The 70% ethanol sol was transferred to the still and 100 milliliters of benzene stirred in. The ternary of water (7.4 weight percent), ethanol (18.5 weight percent) and benzene (74.1 weight percent) boils normally at 65° C. while the binary of ethanol (32.6 weight percent) and benzene (67.6 weight percent) boils normally at 68° C. The initial vapor temperature was 63° C. The volume of the liquid in the still was kept constant by adding a mixture of 77 volume percent benzene and 23 volume percent ethanol until the vapor temperature rose to 66° C. The distillation was continued using ethanol to keep the volume constant until the vapor temperature reached 77° C., approximately the boiling point of pure ethanol. The removal of water required 2.5 liters of distillate which would indicate that the ternary contained about 5.7 weight percent of water. One liter of distillate to complete the removal of benzene was collected after the water was removed and this was replaced with ethanol. The sol was stored at 40° C. and showed a shelf life of at least two weeks. A portion of the sol was evaporated to dryness which showed the solids content to be 4.3%.

The pressure bomb was charged with 150 grams of this sol which was then autoclaved in a manner similar to that of Example 1 at a temperature of 295° C. and 1700 lbs. p.s.i.g. pressure with a venting period of 1½ hours. The product thus obtained was an aerogel which was hydrophobic.

While the aerogels specifically described in the above examples were made with from 10 to 50% of the alkali silicones, it is to be understood that the invention is not limited to this range of proportions. The proportions may be suitably varied according to the properties desired in the final product and its intended application. It has, however, been found that percentages of the silicone beyond about 85% have proven unsatisfactory. Either the products did not have the characteristics of an aerogel or the silicones volatilized away.

Although hydrogen ion exchange resins were used in the above examples, mineral acids could have been used to form the colloidal solution of silicic and siliconic acids. The ability to use mineral acids in place of ion exchange resins and still produce a salt-free product is an important distinction over prior methods, for, in commercial practice, ion exchange resins are more costly from a material and from a processing point of view. In addition, ion exchange resins require regeneration. On the other hand, when mineral acids, such as hydrochloric or sulfuric acid, are used prior to azeotropic distillation, the inorganic salts formed become less and less soluble as water is removed. After essentially all of the water is removed, the salts have precipitated and may be easily removed by decantation, centrifugation or other well known means. Autoclaving the resulting alcosol thus gives an essentially salt-free aerogel.

It has been found that the use of aerogels prepared from 100% alcoholic sols produced lubricating fluids and greases of superior properties. In order to illustrate these results, greases were prepared by mixing lubricating fluids and the aerogels of this invention until a stiff paste was formed. These pastes were then rolled on a three-roll mill. The consistency was then adjusted by adding sufficient aerogel filler and oil as needed. The final formulation was milled three times before testing the stiffness of the resulting greases with a micropenetrometer. A grease was prepared thickened with both an aerogel made in accordance with the process of this invention and from an aerogel which was prepared from a less than 100% alcohol sol, i.e., in which the water had not been azeotropically distilled away. Filler A, below, is the aerogel produced by Example 1, above, autoclaved to a final temperature of 305° C. Filler B was made with an aerogel with the same relative proportions of silica and silicone, but the sol contained 30% water at the time of autoclaving.

A comparison of the micropenetrometer readings of these two greases is given in Table D which follows.

Table D

| Filler | Density. g/ml. | Lubricating Fluids | | | | | | | |
|---|---|---|---|---|---|---|---|---|---|
| | | Heavy Turbine Oil | | Dioctyl Sebacate | | Silicone Oil [1] | | Silicone Oil [2] | |
| | | Percent Filler | Micropenetrometer | Percent Filler | Micropenetrometer | Percent Filler | Micropenetrometer | Percent Filler | Micropenetrometer |
| A | 0.064 | 4.0 | 177 | 5.8 | 177 | 4.0 | 190 | 4.1 | 193 |
| B | 0.032 | 6.3 | 155 | 8.6 | 205 | 7.4 | 175 | 7.4 | 180 |

[1] Methyl phenylpolysiloxane.
[2] Methylpolysiloxane.

A micropenetrometer tests the tendency of a grease to deform under a load. The above Table D indicates that approximately the same micropenetrometer readings (between about 150 and 200) can be obtained with considerably smaller quantities of filler when using the aerogel of this invention as the filler material. In view of the inverse correlation of bulk density and thickening efficiency, it would appear that it is the chemistry of the surface that controls the thickening action rather than the specific surface area.

Aerogels produced in accordance with this invention, in addition to their use as thickening agents for greases, can be used as reinforcing agents for rubbers including silicone rubbers, core plate enamel fillers, brake band fillers, wood lacquer flatting agents, photographic film, thermal insulation, fillers for vinyl resins and in other known applications of silica gels such as catalyst or catalyst carriers.

What I claim as new and desire to secure by Letters Patent of the United States is:

1. A process for preparing an aerogel which comprises (1) acidifying an aqueous solution of an alkali-metal silicate and an alkali-metal organo-siliconate, in which the organo group is selected from the class consisting of alkyl and aryl groups, to form an aqueous sol, the amount of siliconate not exceeding 85%, by weight, of the total weight of the silicate and siliconate, (2) replacing the water from the aqueous sol with a non-aqueous solvent by distilling the water therefrom with an azeotrope comprising an aliphatic monohydric alcohol having a critical temperature below 300° C., said azeotropic distillation being carried out until substantially all the water has been removed from the aqueous sol, and (3) removing the alcohol at a temperature and pressure of at least the critical temperature and pressure of the alcohol.

2. The aerogel prepared in accordance with the process of claim 1.

3. A process for preparing an aerogel which comprises (1) acidifying an aqueous solution of sodium silicate and sodium methyl siliconate to form an aqueous sol, the amount of siliconate not exceeding 85%, by weight, of the total weight of the silicate and siliconate, (2) removing the water from the aqueous sol by azeotropic distillation while maintaining the volume of solvent constant by the addition of an alcohol selected from the group consisting of ethanol and propanol to produce a substantially water-free alcoholic sol, and (3) removing the alcoholic solvent at a temperature of at least the critical temperature of the solvent and at a pressure of at least the critical pressure of the solvent.

4. An aerogel prepared in accordance with the process of claim 3.

5. A process for preparing an aerogel which comprises (1) acidifying an aqueous solution of sodium silicate and sodium methyl siliconate to form an aqueous sol, the amount of siliconate not exceeding 85%, by weight, of the total weight of the silicate and siliconate, (2) removing the water from the aqueous sol by distilling the water therefrom with an azeotrope comprising ethanol while maintaining the volume of solvent constant by the addition of additional ethanol to produce a substantially water-free alcoholic sol, and (3) removing the alcoholic solvent at a temperature of at least the critical temperature of the solvent and at a pressure of at least the critical pressure of the solvent.

6. A process for preparing an aerogel which comprises (1) acidifying an aqueous solution of sodium silicate and sodium methyl siliconate to form an aqueous sol, the amount of siliconate not exceeding 85%, by weight, of the total weight of the silicate and siliconate, (2) removing the water from the aqueous sol by distilling the water therefrom with an azeotrope comprising propanol while maintaining the volume of solvent constant by the addition of additional propanol to produce a substantially water-free alcoholic sol, and (3) removing the alcoholic solvent at a temperature of at least the critical temperature of the solvent and at a pressure of at least the critical pressure of the solvent.

References Cited in the file of this patent
UNITED STATES PATENTS

| | | |
|---|---|---|
| 2,093,454 | Kistler | Sept. 21, 1937 |
| 2,441,422 | Krieble et al. | May 11, 1948 |
| 2,583,604 | Sirianni et al. | Jan. 29, 1952 |
| 2,657,149 | Iler | Oct. 27, 1953 |
| 2,786,042 | Iler | Mar. 19, 1957 |